US005366384A

United States Patent [19]

Dolce et al.

[11] Patent Number: 5,366,384
[45] Date of Patent: Nov. 22, 1994

[54] SERVICE EQUIPMENT FOR USE IN HOSTILE ENVIRONMENTS

[75] Inventors: James L. Dolce, Lakewood; Andrew L. Gordan, Cleveland, both of Ohio

[73] Assignee: The United States of America, as represented by the Administrator National Aeronautics and Space Administration, Washington, D.C.

[21] Appl. No.: 104,951

[22] Filed: Jul. 26, 1993

Related U.S. Application Data

[62] Division of Ser. No. 889,572, May 28, 1992, Pat. No. 5,290,121.

[51] Int. Cl.⁵ .................... H01R 13/639; B25B 5/00
[52] U.S. Cl. .................... 439/372; 439/196; 439/374
[58] Field of Search ............ 439/310, 372, 345, 347, 439/374, 378, 357, 358, 362, 196, 700, 824; 403/322, 353, 373, 374

[56] References Cited

U.S. PATENT DOCUMENTS

| | | | |
|---|---|---|---|
| 970,888 | 9/1910 | Covert | 269/94 X |
| 1,027,695 | 5/1912 | Conboy | 269/242 X |
| 2,242,487 | 5/1941 | Swanson | 269/242 X |
| 2,660,926 | 12/1953 | Talley | 74/436 X |
| 2,788,929 | 4/1957 | Gallagher | 269/242 X |
| 2,997,682 | 8/1961 | Grimes et al | 439/372 |
| 3,170,214 | 2/1965 | Cochrane | 269/94 X |
| 3,361,005 | 1/1968 | Carpenter | 74/436 |
| 3,447,036 | 5/1969 | Dore et al. | 439/364 |
| 3,718,887 | 2/1973 | Solomon et al. | 439/362 |
| 4,115,020 | 9/1978 | Langsford | 403/322 |
| 4,556,270 | 12/1985 | Schutzle et al. | 439/372 |
| 4,821,393 | 4/1989 | Spigarelli | 269/242 X |

Primary Examiner—Neil Abrams
Attorney, Agent, or Firm—Gene E. Shook; Guy M. Miller

[57] ABSTRACT

Service equipment 10 for use in hostile environments includes a detachable service unit 20 secured to a stationary service unit 50 as shown in FIG. 1. The detachable service unit includes a housing 28 with an exterior plate 22, a power control interface 16 for connection to an exterior power source 48, locating pins 30a-30d located in said exterior plate, an electrical connector 40 in the exterior plate electrically coupled to said power control interface, and a pair of clamping receptacles 24 and 25 formed in the exterior plate and located on adjacent opposite edges of the exterior plate as shown in FIGS. 4A and 4B. The stationary unit includes an electrical connector 46 for connection to the electrical connector of the detachable service unit, a clamping apparatus 60 for clamping and unclamping the detachable service unit from the stationary unit, a base clamp assembly 120 shown in FIG. 5A for mounting the clamping apparatus onto the stationary unit, and locating pin holes 51 shown in FIG. 2 for receiving the locating pins and aligning the detachable service unit onto the stationary unit. The detachable service unit and stationary unit have mating scalloped faces shown in FIG. 4B which aid in alignment and provide a mechanism for heat dissipation.

9 Claims, 4 Drawing Sheets

SERVICE EQUIPMENT FOR USE IN HOSTILE ENVIRONMENTS

ORIGIN OF THE INVENTION

The invention described herein was made by an employee of the United States Government, together with a contractor employee performing work under a NASA contract and is subject to the provisions of Section 305 of the National Aeronautics and Space Act of 1958, Public Law 85-568 (72 Statute 435; 42 U.S.C. 2457).

This application is a division of application Ser. No. 07/889,572 which was filed May 28, 1992, and issued as U.S. Pat. No. 5,290,121 on Mar. 1, 1994.

FIELD OF THE INVENTION

The present invention is directed to installation, maintenance or replacement of service equipment in hostile environments, e.g., space, nuclear facilities, etc., and in particular to installation, maintenance or replacement of electrical, electronic and mechanical service equipment by a person with a power pac, by robotic end effectors controlled through a remote computer terminal interface or by a person controlling the robotic end effectors.

BACKGROUND

In hostile environments, such as in space and nuclear facilities, access to service equipment components is limited and direct human control of the components is usually prohibited. Further, the components may experience unforeseen problems, due to the particular environment, which require on site correction. For example, a NASA space station has many components which are directly exposed to the harsh environment of space. Astronauts on the space station cannot easily access such components for maintenance and replacement in the event that the service equipment becomes inoperative. Thus, there is a need to provide an effective method for installing, maintaining and replacing service equipment, such as a service unit which can be easily and quickly clamped and unclamped from the service equipment for service or replacement.

Conventional clamping assemblies are generally unsuitable for use in hostile environments, since conventional clamps are usually designed for direct access. For example, U.S. Pat. No. 4,115,020 to Langsford discloses a clamp for attaching clip-on units to a cargo container wherein the clamp is formed as a pivotal arm receivable in an opening for locking. Such a clamp is unsuitable for space station use because the clamp is not designed for remote access.

Further, service equipment generally includes electrical connectors for controlling various electrical and mechanical devices in the hostile environment. Electrical connectors are needed which can be easily and accurately connected and disconnected in order to cooperate with the clamping and unclamping of the service equipment. Conventional electrical connectors presently used by the military or commercial industry require precise alignment and are therefore unsuitable for use in combination with limited access clamping assemblies used in hostile environments. U.S. Pat. No. 2,997,682 to Grimes et al., U.S. Pat. No. 4,959,609 to Prokopp et al. and U.S. Pat. No. 4,990,022 to Watanabe et al. disclose examples of such conventional electrical connectors.

OBJECTS AND SUMMARY OF THE INVENTION

It is an object of the present invention to provide a system in which service equipment can be easily and quickly installed, maintained and replaced in a hostile environment.

It is another object of the present invention to provide a clamping apparatus which can be controlled automatically or manually for installation, maintenance and replacement of service equipment in a hostile environment.

It is another object of the present invention to provide a clamping apparatus which can be removed and replaced while in the hostile environment.

It is a further object of the present invention to provide service equipment having an efficient thermal interface for temperature control of service equipment in a hostile environment.

To achieve the foregoing and other objects and advantages, and to overcome the shortcomings of conventional devices discussed above, service equipment for use in hostile environments in accordance with the present invention comprises a detachable service unit including an exterior plate, a power control interface for connection to an exterior power source, at least two locating pins located on the exterior plate, a first electrical connector coupled to the exterior plate and electrically coupled to the power control interface, and a pair of clamping receptacles formed on adjacent opposite edges of the lower surface of the exterior plate; and a stationary unit including a second electrical connector for connection to the first electrical connector, a clamping apparatus for clamping and unclamping the detachable service unit from the stationary unit, a clamp assembly for mounting the clamping apparatus onto the stationary unit, and at least two locating pin holes for receiving the locating pins of the detachable service unit and aligning the detachable service unit onto the stationary unit.

Furthermore, the clamping apparatus in accordance with the present invention, for manual or robotic replacement of a detachable service unit from a stationary unit in hostile environments, comprises a clamping base plate for mounting to the stationary unit, a pair of opposing clamp units coupled to the clamping base plate, and a drive assembly secured to the pair of opposing clamp units, including a drive shaft and at least one drive mechanism for rotating the drive shaft to cause linear displacement of the pair of opposing clamp units and thus move the pair of opposing clamp units between a clamped position and an unclamped position to clamp and unclamp the detachable service unit from the stationary unit.

Also, the clamp assembly in accordance with the present invention, for removable securement of units in a modular assembly, comprises a Geneva cam driver having a spline, an engagement roller, a disengagement roller and an interlocking formation; an irregular Geneva cam having an engagement groove for receiving the engagement roller of the Geneva cam driver, a disengagement groove for receiving the disengagement roller of the Geneva cam driver, an arc groove and a clamp face; a drive shaft coupled to the spline of the Geneva cam driver; and an operating mechanism for rotating the drive shaft in a first direction to cause the engagement roller to engage the engagement groove and to cause the clamp face to clamp a unit to the modular assembly, and for rotating the drive shaft in a second direction to cause the disengagement roller to engage the disengagement groove and to cause the clamp face to unclamp the unit from the modular assembly.

Other objects, advantages and salient features of the invention will become apparent from the following detailed description which, taken in conjunction with the annexed drawings, discloses preferred embodiments of the invention.

BRIEF DESCRIPTION OF THE DRAWINGS

The inventions will be described in detail with reference to the following in which like reference numerals refer to like elements wherein.

DETAILED DESCRIPTION OF PREFERRED EMBODIMENTS

Figure 1:
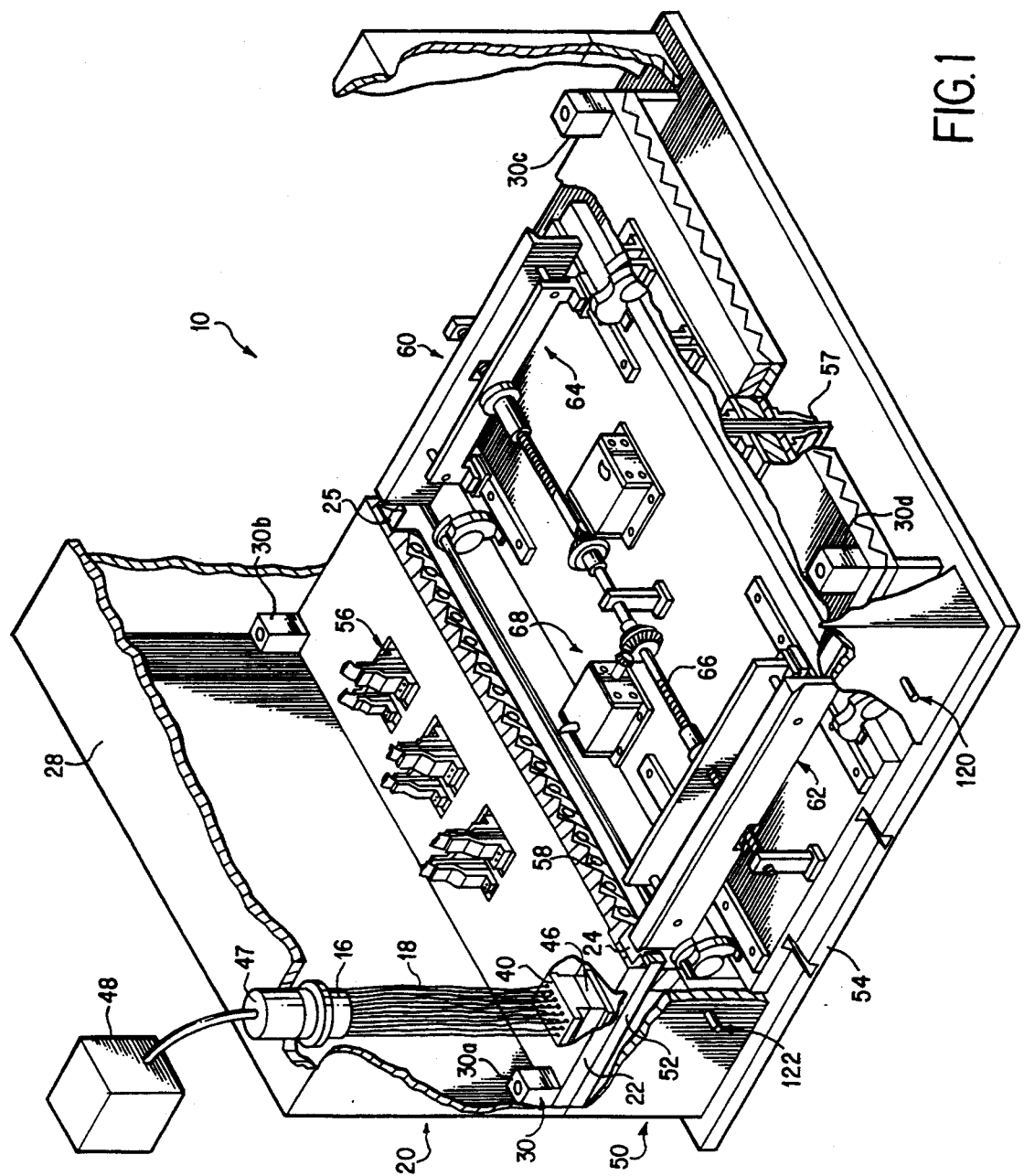
FIG. 1 is a general perspective overview of the service equipment according to the present invention.

FIG. 1 is a general overview of the service equipment 10. The service equipment 10 comprises a detachable service unit 20 and a stationary unit 50. Detachable service unit 20 includes a housing 28 having an exterior plate 22 which abuts and mates with an exterior plate 52 of stationary unit 50. A clamping apparatus 60 located within stationary unit 50 clamps detachable service unit 20 onto stationary unit 50. Further, a pair of base clamp assemblies 120 and 122 are also located within stationary unit 50 to clamp clamping apparatus 60 onto a base plate 54 of stationary unit 50.

A plurality of scallops are formed on each of the abutting faces of exterior plate 22 of detachable service unit 20 and exterior plate 52 of stationary unit 50 to facilitate accurate positioning and lateral alignment of the detachable service unit onto the stationary unit. The scalloped faces also facilitate efficient dissipation of unwanted heat generated within service equipment 10. The scallops are formed at about a 45° angle, which increases the thermal interface contact area between exterior plates 22 and 52. Further, a plurality of circulation pipes 58 are formed within the scallops of exterior plate 52 for circulating a thermal coolant medium to dissipate the unwanted heat generated by various mechanical and electrical components within service equipment 10. Circulation pipes 58 are connected to input and output pipes of a thermal-control system (not shown). The thermal coolant medium may be air, a non-freezing ammonia compound or other known substances.

Referring to FIG. 1, detachable service unit 20 includes a power control interface 16 located on an exterior surface of detachable service unit housing 28. Interface 16 includes electrical leads 18 which provide electrical connection to electrical connector 40 as shown. A connector 47 of a control device 48 can be coupled to power control interface 16 to send and receive signals to and from the electrical and mechanical devices within service equipment 10.

Figure 3:
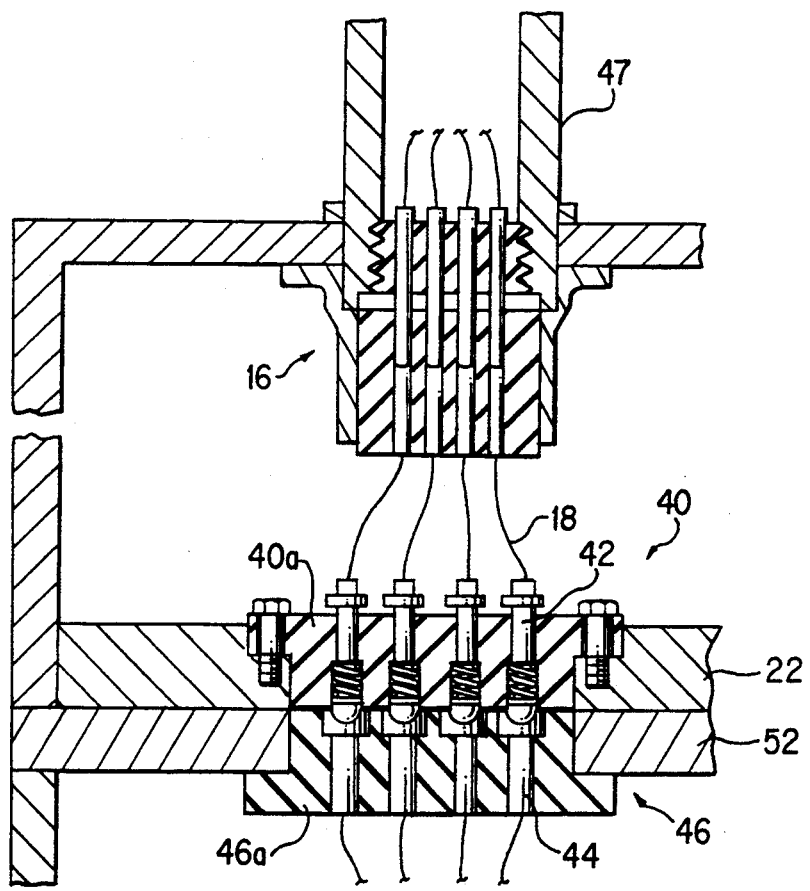
FIG. 3 is an illustration of the electrical connectors in the service equipment according to the present invention.

As shown in FIG. 3, electrical connector 40 of detachable service unit 20 mates with an electrical connector 46 of stationary unit 50. A male plug 40a of electrical connector 40 is mounted in exterior plate 22 of detachable service unit 20, and a female plug 46a of electrical connector 46 is mounted in exterior plate 52 of stationary unit 50. Male plug 40a has a plurality of spring loaded and convex faced electrical pins 42, and female plug 46a has a corresponding plurality of concave receptor pins 44 which mate with and are electrically coupled to corresponding ones of electrical pins 42.

Electrical connectors 40 and 46 are designed to transmit signals for control and actuation of motors, as discussed below, to transmit electrical signals indicating the torque across the mating surfaces of exterior plates 22 and 52 to achieve proper pressure (psi) between the plates for proper thermal interface, and to transmit electrical signals indicating electrical continuity of other electrical connectors 56 and 57 when detachable service unit 20 is clamped onto stationary unit 50. Further, unlike conventional electrical connectors, electrical pins 42 in the male plug need not physically enter the female plug to obtain proper electrical contact. Rather, spring loaded and convex faced electrical pins 42 need only contact the required contact area (i.e., the concave surface) of female receptor pins 44. Due to the design, the spring loaded and convex faced electrical pins 42 also act as locating pins when detachable service unit 20 is clamped onto stationary unit 50.

Additional electrical connectors 56 and 57 disposed in detachable unit 20 and stationary unit 50, respectively, are designed to mate when the units are aligned.

Figure 2:
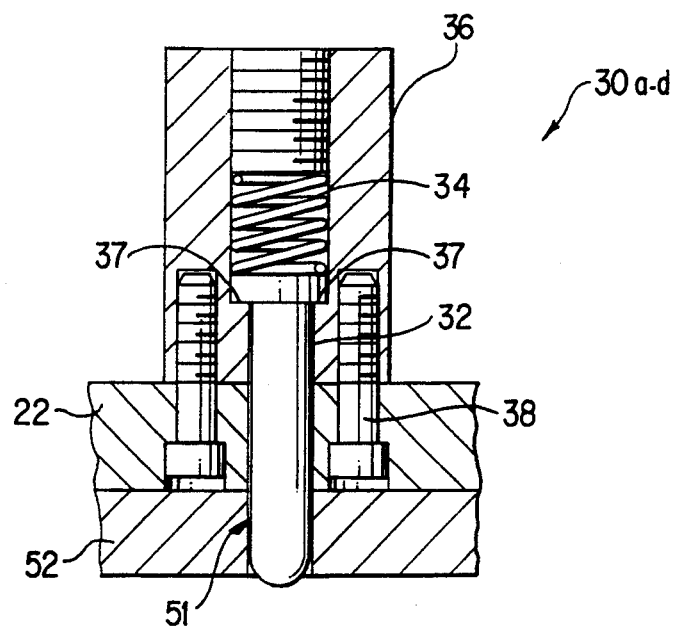
FIG. 2 is a cross-sectional view of spring loaded locating pins within the service equipment according to the present invention.

As shown in FIG. 1, exterior plate 22 is coupled to exterior plate 52 by means of four spring loaded locating pins 30a–30d disposed on the corners of exterior plate 22. As illustrated in greater detail in FIG. 2, each spring loaded pin (one shown) comprises a pin 32 housed in a tubular pin housing 36 and biased by a helical spring 34. Housing 36 includes interior stopping shoulders 37 which retain the head of the pin and prevent the pin from falling out of housing 36. Screws 38 mount housing 36 to exterior plate 22 of detachable service unit 20. Exterior plate 52 of stationary unit 50 has location points 51 formed as receiving holes in each corner to receive locating pins 32. The spring loaded locating pins 30a–30d aid in proper positioning of the detachable service unit 20 onto the stationary unit 50 prior to clamping, and ensure that the units do not shift with respect to each other during and after clamping. Pins 30a–30d also aid in alignment of electrical connectors 40, 46, 56 and 57.

Figure 4A:
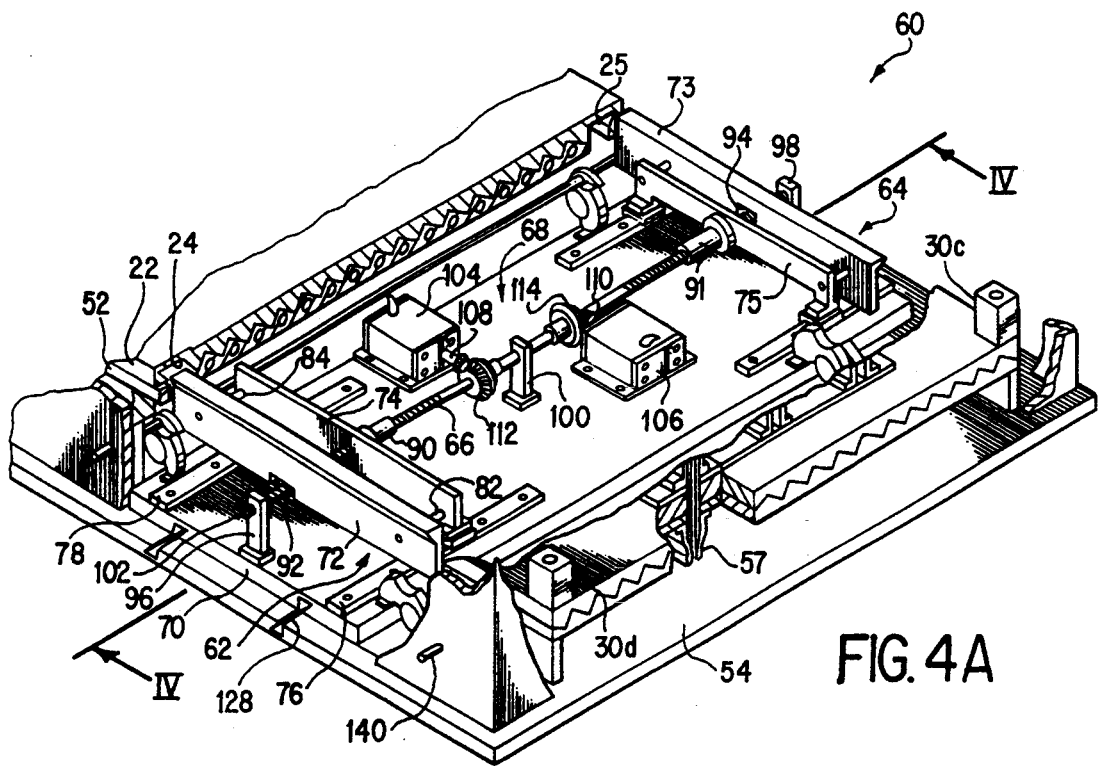
FIG. 4A is a perspective view of the clamping apparatus within the service equipment according to the present invention.

FIG. 4A shows clamping apparatus 60 in detail for manual or robotic installation or replacement of detachable service unit 20 from stationary unit 50. The clamping apparatus 60 has three major components: 1) a pair of opposing clamp units 62 and 64; 2) a drive shaft 66 secured to clamp units 62 and 64; and 3) a drive mechanism 68 for rotating drive shaft 66 to cause linear displacement of clamp units 62 and 64. Clamp units 62 and 64 are designed to slide linearly in opposite directions to engage clamping receptacles 24 and 25 formed in exterior plate 22 of detachable unit 20. Clamping apparatus 60 is mounted to a clamping base plate 70 which is detachable from base plate 54.

Figure 4C:
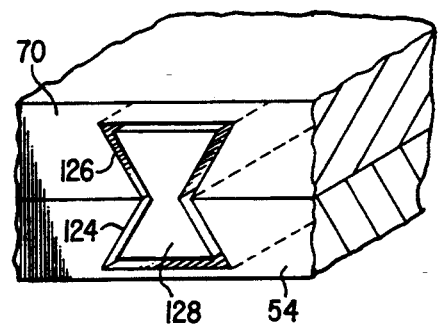
FIG. 4C is an enlarged perspective view of a key connector between base plates of the clamping apparatus and stationary service unit shown in FIG. 4A.
Figure 4B:
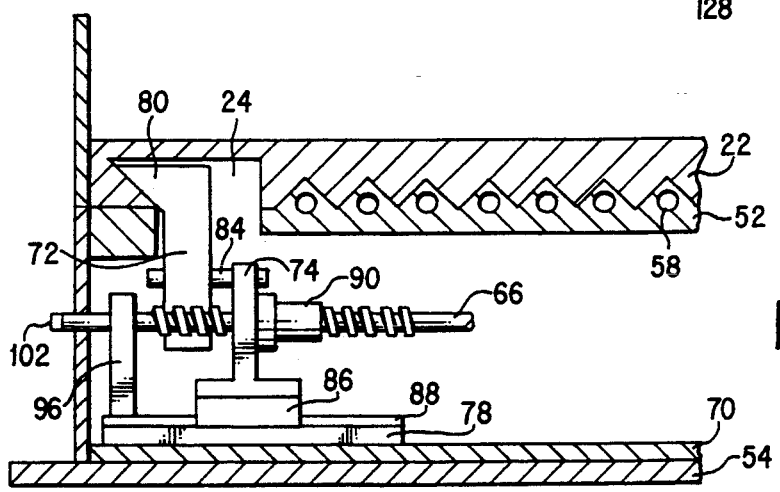
FIG. 4B is a cross-sectional view along IV—IV of FIG. 4.

As shown in FIG. 4A, opposing clamp units 62 and 64 are identical. FIG. 4B illustrates clamp unit 62 in detail, which comprises a generally rectangular clamping plate 72, a rectangular clamp support 74 and a pair of identical linear ball guides 76 and 78 (only guide 78 being shown in FIG. 4B) coupled to clamping base plate 70. Clamping plate 72 has an acute clamping protrusion 80 with an outwardly extending beveled face designed to engage the beveled inner face of clamping receptacle 24 located in exterior face 22 of detachable service unit 20. Clamping plate 72 extends outwardly from a slot in exterior plate 52 of stationary unit 50. Clamp support 74 is attached to clamping plate 72 by a pair of identical dowels 82 and 84 (dowel 84 being shown in FIG. 4B) in a spaced relationship. Linear ball guides 76 and 78 are elongate rails secured to base plate 70 in a parallel relationship and are preferably made of a material having a low coefficient of friction. As seen in FIG. 4B, clamp support 74 has a runner 86 secured thereto for sliding engagement with linear ball guide 78. An identical runner is disposed on the other end of clamp support 74 for engagement with linear ball guide 76. Each ball guide may include grooves 88 for engagement with edges of its respective runner, as shown for example in FIG. 4B.

Drive shaft 66 is coupled between clamp units 62 and 64 and is a ball screw shaft having right hand threads on one end and left hand threads on the other end. As shown in FIG. 4B, a ball nut 90 is threadedly engaged on ball screw shaft 66 and is secured to clamp support 74. A ball nut 91 is also secured in the same manner on the other end of ball screw shaft 66 to clamp support 75 of clamp unit 64. Ball screw shaft 66 freely extends through grooves 92 and 94 in clamping plates 72 and 73 and is rotatably supported at each end by bearing supports 96 and 98 and at the center thereof by bearing support 100. Each end of ball screw shaft 66 has an end formation, preferably a ½inch socket 102, for receiving a tool, such as a torque wrench. During rotation of drive shaft 66, the different pitch threads allow ball nuts 90 and 91 to travel down the shaft in opposite directions, thus expanding or contracting clamp units 62 and 64 with respect to each other.

Drive mechanism 68 comprises a pair of motors 104 and 106, preferably DC motors, coupled to drive shaft 66 via shafts 108 and 110 and miter gears 112 and 114, respectively. When electrical signals are sent to motors 104 and 106 from control device 48, each motor rotates its respective shaft and miter gear. Miter gears 112 and 114 transmit the rotation of shafts 108 and 110 to ball screw shaft 66. The rotation of ball screw shaft 66 causes ball nuts 90 and 91 to linearly move in opposite directions along the axis of the ball screw shaft 66. Because ball nuts 90 and 91 are rigidly coupled to clamp supports 74 and 75, and clamp supports 74 and 75 are slidably engaged with the linear ball guides, opposing clamp units 62 and 64 are moved linearly. As discussed above, the opposite threads on ball screw shaft 66 allow clamp units 62 and 64 to expand or contract with respect to each other while drive shaft 66 is rotated in a single direction. Using two motors 104 and 106 provides sufficient power to retain clamp units 62 and 64 securely within clamping receptacles 24 and 25 and also provides a backup system if one of the motors becomes inoperational due to mechanical or electrical failure.

Further, if both motors become inoperative, a person or robotic end effector can attach a tool, such as a torque wrench, to one or both of the ½inch sockets 102 in the ends of drive shaft 66, and detachable service unit 20 can be manually unclamped and clamped to stationary unit 50 by rotating the torque wrench in the required direction.

In operation, a robotic arm or a person, such as an astronaut, positions detachable service unit 20 onto stationary unit 50. Exterior plates 22 and 52 are color coded to indicate proper positioning of detachable service unit 20 onto stationary unit 50. Detachable service unit 20 is moved in a longitudinal direction of the scallops until spring loaded locating pins 30a–30d engage their respective locating holes in stationary unit 50 and electrical pins 42 of electrical connector 40 are in contact with receptor pins 44 of electrical connector 46, indicating that detachable unit 20 is in the clamping position. An operator then engages connector 47 of control device 48 to control interface 16 in detachable unit 20 via a robotic end effector or astronaut's power pac. A signal, such as an LED on the power pac, will indicate to the operator that detachable unit 20 is not clamped, that electrical connectors 40 and 46 are in contact and that power can be supplied to drive mechanism 68.

Control device 48 then supplies power to drive motors 104 and 106 to rotate shafts 108 and 110 and miter gears 112 and 114 to cause rotation of drive shaft 66 in a first direction. In the preferred embodiment, 12 volts of electrical power are supplied to drive mechanism 68. As discussed above, rotation of drive shaft 66 causes ball nuts 90 and 91 to travel down shaft 66 and linearly displace clamp supports 74 and 75 on the linear ball guides causing the beveled faces of clamping plates 72 and 73 to engage clamping receptacles 24 and 25. The beveled faces aid in forcing exterior plates 22 and 52 toward each other in tight engagement.

Control device 48 has a current sensing linear integrated circuit for sensing the current supplied to the motors. The current is proportional to the torque applied across the mating surfaces of exterior plates 22 and 52. When the torque reaches a preset value, the power to motors 104 and 106 is removed. The preset value is representative of the required pressure per square inch across the scalloped faces of exterior plates 22 and 52 to achieve the desired thermal interface. Additionally, data signals, such as an LED, will provide an indication to control device 48 that detachable service unit 20 is properly clamped to stationary unit 50.

The above sequence also applies to unclamping detachable service unit 20 from stationary unit 50, except that motors 104 and 106 turn drive shaft 66 in a second opposite direction to the first direction to contract clamp units 62 and 64 and the sequence is reversed.

Figure 5A:
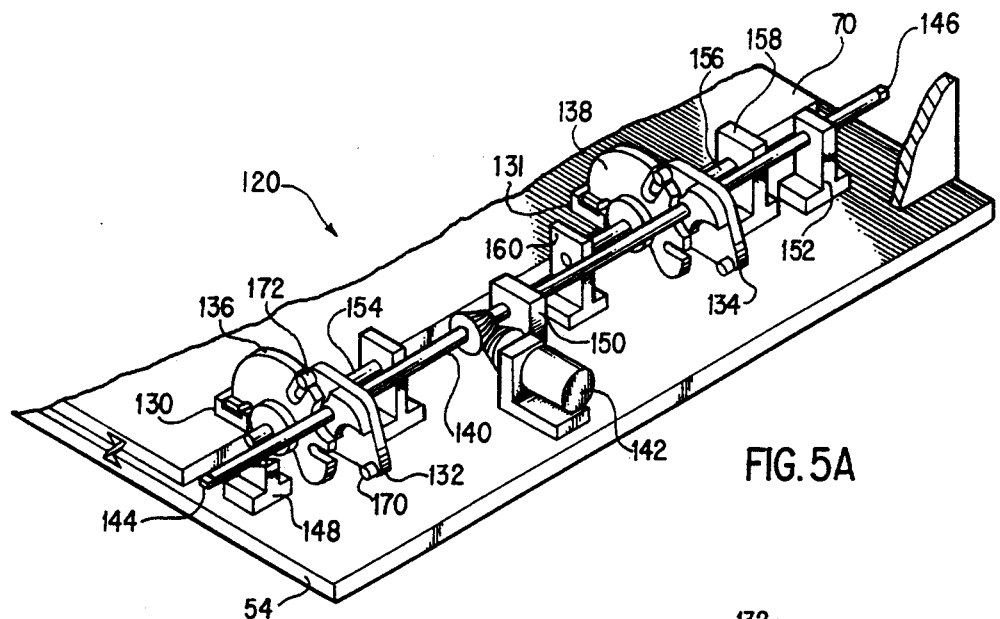
FIG. 5A is a perspective view of the clamp assembly according to the present invention.

FIG. 5A illustrates in detail one of the base clamp assemblies 120 which clamps base plate 70 of clamping apparatus 60 onto base plate 54 of stationary unit 50 for quick removal or attachment of clamping apparatus 60 in the event that clamping apparatus 60 needs repair or replacement. A pair of identical base clamp assemblies 120 and 122, shown in FIGS. 1 and 4A, are located in stationary unit 50 on opposite sides of base plate 70 of clamping apparatus 60. A plurality of dovetail grooves and key connectors may also be provided between the base plates as shown in detail in FIG. 4C. Base plate 54 of stationary unit 50 and clamping base plate 70 have opposed dovetail grooves 124 and 126, respectively, and a complementary dovetail key connector 128 is disposed within the grooves to couple base plate 54 to clamping base plate 70 (the spacing between the grooves and connector has been exaggerated for clarity). Key connectors 128 allow base plate 70 to slide with respect to base plate 54. Clamping apparatus 60 can therefore be accurately aligned to slide in and out of stationary unit 50 along the longitudinal axis of key connectors 128. Once clamping apparatus 60 is in place within stationary unit 50, clamp assemblies 120 and 122 engage the edge of clamping base plate 70 at clamp supports 130 and 131, shown in FIG. 5A with respect to clamp assembly 120.

Referring to FIG. 5A, clamp assembly 120 comprises a pair of Geneva cam drivers 132 and 134, a pair of irregular Geneva cams 136 and 138, a drive shaft 140 coupled to Geneva cam drivers 132 and 134 and an optional drive mechanism 142. Drive shaft 140 has end formations 144 and 146, such as ½ inch sockets, located at each end for receiving a tool, such as a torque wrench (not shown), for rotating drive shaft 140 in first and second directions to clamp and unclamp base plate 70. Drive mechanism 142 includes a gear assembly coupled to drive shaft 140 and may also be used to rotate drive shaft 140 to clamp and unclamp base plate 70.

Drive shaft 140 is rotatably supported at each end and the center thereof by a series of uprights 148, 150, and 152. Each irregular Geneva cam 136 and 138 is supported by a rotatable shaft 154 and 156, respectively, supported by a pair of uprights. For example, shaft 156 is rotatably supported by uprights 158 and 160.

Figure 5B:
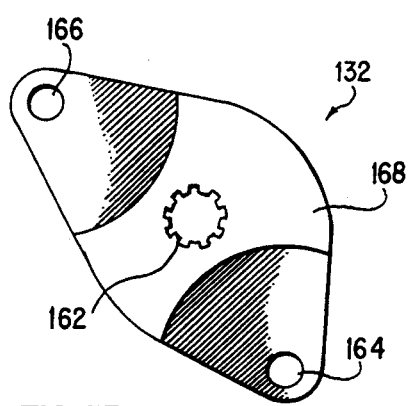
FIG. 5B is a side view of the Geneva cam driver of the clamp assembly.
Figure 5C:
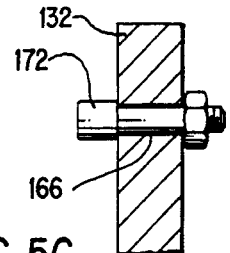
FIG. 5C is a side view in cross section of the Geneva cam driver of FIG. 5A.

As shown in FIG. 5B, Geneva cam driver 132 has a central spline 162, an engagement aperture 164, a disengagement aperture 166, and an interlocking formation 168. A roller 172, as shown in FIG. 5C, is bolted into disengagement aperture 166 to form a disengagement roller of Geneva cam driver 132. A roller 170 is also bolted into engagement aperture 164 to form an engagement roller. Engagement and disengagement rollers 170 and 172 are located at substantially opposite ends of Geneva cam driver 132, and spline 162 and interlocking formation 168 are located therebetween. Geneva cam driver 134 is identical to Geneva cam driver 132. Shaft 140 is connected through the splines of Geneva cam drivers 132 and 134 for transmitting rotation of shaft 140 from the torque wrench or drive mechanism 142 to Geneva cam drivers 132 and 134.

Figure 5D:
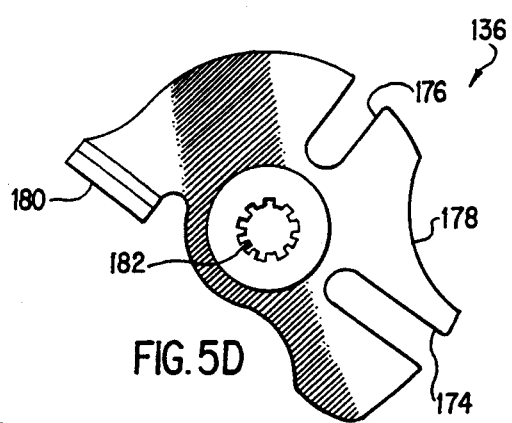
FIG. 5D is a side view of the irregular Geneva cam of the clamp assembly.

As shown in FIG. 5D, irregular Geneva cam 136 has an engagement slot 174 located about 90° from a disengagement slot 176, an arc groove 178 formed on its outer circumference located between engagement and disengagement slots 174 and 176, and a clamp face 180 located approximately 90° from disengagement slot 176. Further, irregular Geneva cam 136 has a central spline 182 about which it rotates. Irregular Geneva cam 138 is identical to cam 136. Irregular Geneva cam 136 is carried by shaft 154 through spline 182, and irregular Geneva cam 138 is carried by shaft 156 through a similar spline.

Figure 5E:
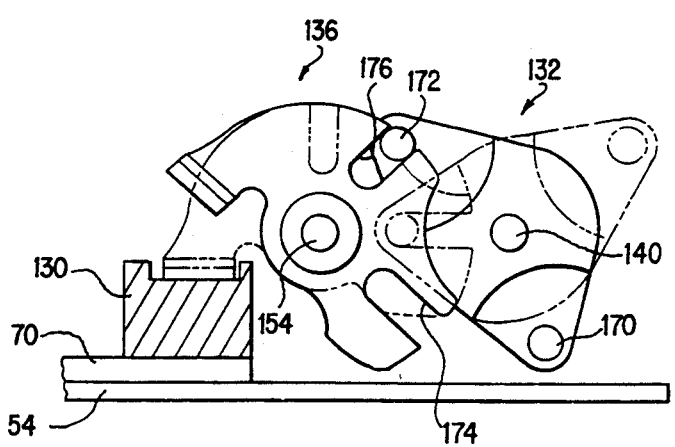
FIG. 5E is a side view of the Geneva cam driver and irregular Geneva cam of the clamp assembly illustrating the operation of the clamp assembly.

When clamping apparatus 60 is to be unclamped from stationary unit 50, a person or robotic end effector attaches a torque wrench to at least one of the end formations 144 and 146 and rotates shaft 140. Alternatively, drive mechanism 142 can be controlled by controller 48 to rotate shaft 140. The rotation of shaft 140 causes rotation of Geneva cam drivers 132 and 134. As shown in FIG. 5E (solid lines), Geneva cam driver 132 rotates about shaft 140 to engage disengagement roller 172 rotates about shaft 140 to engage disengagement roller 172 in disengagement slot 176. Such movement will cause irregular Geneva cam 136 to rotate about shaft 154 and lift clamp face 180 from clamp support 130 of clamping base plate 70. Interlocking formation 168 slidingly mates with arc groove 178 during rotation.

When clamping apparatus 60 is properly positioned on base plate 54 of stationary unit 50, opposite rotation of shaft 140 by the torque wrench or drive mechanism 142 causes Geneva cam driver 132 to engage engagement roller 170 in engagement slot 174. As shown in FIG. 5E (dotted lines), such movement will cause rotation of irregular Geneva cam 136 about shaft 154, locking clamp face 180 onto the top surface of clamp support 130 of clamping base plate 70.

Using the above clamping apparatus and base clamp assemblies, service equipment 10 can be easily and quickly serviced in hostile environments, and unwanted heat generated within service equipment 10 can be efficiently dissipated. The foregoing embodiments are intended to be illustrative and not limiting. Various modifications may be made without departing from the spirit and scope of the invention as defined in the appended claims.

What is claimed is:

1. Service equipment for use in hostile environments comprising:

a detachable service unit including an exterior plate, a power control interface for connection to an exterior power source, at least two locating pins located in said exterior plate, a first electrical connector in said exterior plate electrically coupled to said power control interface, and a pair of clamping receptacles formed in said exterior plate and located on adjacent opposite edges of said exterior plate; and a stationary unit including a second electrical connector for connection to said first electrical connector, a clamping apparatus having a pair of movably mounted spaced protrusions adapted to enter said clamping receptacles for clamping and unclamping said detachable service unit from said stationary unit, a clamp assembly for mounting said clamping apparatus onto said stationary unit, at least two locating pin holes for receiving said locating pins and aligning said detachable service unit onto said stationary unit, and means for cooling said stationary unit thereby removing heat from said service equipment.

2. Service equipment for use in hostile environments comprising:

a detachable service unit including an exterior plate having a first plurality of scallops, a power control interface for connection to an exterior power source, at least two locating pins located in said exterior plate, a first electrical connector in said exterior plate electrically coupled to said power control interface, and a pair of clamping receptacles formed in said exterior plate and located on adjacent opposite edges of said exterior plate;

a stationary unit having a second plurality of scallops for mating with said first plurality of scallops of said detachable service unit, and a second electrical connector for connection to said first electrical connector; and a clamping apparatus engaging and releasing said clamping receptacles for clamping and unclamping said detachable service unit from said stationary unit, a clamp assembly for mounting said clamping apparatus onto said stationary unit, and at least two locating pin holes for receiving said locating pins and aligning said detachable service unit onto said stationary unit.

3. The service equipment of claim 2 wherein a circulation pipe is formed within said second plurality of scallops for circulating thermal liquid coolant medium to dissipate heat generated within said service equipment.

4. The service equipment of claim 1 wherein said first electrical connector comprises a plurality of spring loaded electrical pins for engagement with terminals in said second electrical connector, said plurality of spring loaded electrical pins transferring signals between said exterior power source and the service equipment.

5. The service equipment of claim 1 wherein said clamping apparatus is removably coupled to said stationary unit.

6. Service equipment for use in hostile environments comprising:

a detachable service unit including an exterior plate, a power control interface for connection to an exterior power source, at least two locating pins located in said exterior plate, a first electrical connector in said exterior plate electrically coupled to said power control interface, and a pair of clamping receptacles formed in said exterior plate and located on adjacent opposite edges of said exterior plate; and a stationary unit including a second electrical connector for connection to said first electrical connector, a clamping apparatus comprising a pair of opposing clamp units coupled to a clamping base plate;

a drive shaft secured to said pair of opposing clamp units; and at least one drive mechanism for rotating said drive shaft to cause linear displacement of said pair of opposing clamp units and thus move said pair of opposing clamp units between a clamped position in engagement with said clamping receptacles and an unclamped position out of engagement with said clamping receptacles to clamp and unclamp the detachable service unit to and from the stationary unit, a clamp assembly for mounting said clamping apparatus onto said stationary unit, and at least two locating pin holes for receiving said locating pins and aligning said detachable service unit onto said stationary unit.

7. Service equipment for use in hostile environments comprising:

a detachable service unit including an exterior plate, a power control interface for connection to an exterior power source, at least two locating pins located in said exterior plate, a first electrical connector in said exterior plate electrically coupled to said power control interface, and a pair of clamping receptacles formed in said exterior plate and located on adjacent opposite edges of said exterior plate; and a stationary unit including a second electrical connector for connection to said first electrical connector, a clamping apparatus for clamping and unclamping said detachable service unit from said stationary unit by engagement and disengagement of said clamping receptacles, at least two locating pin holes for receiving said locating pins and aligning said detachable service unit onto said stationary unit, and a clamp assembly comprising at least one Geneva cam driver having a spline, an engagement roller and a disengagement roller;

at least one Geneva cam having an engagement slot for receiving said engagement roller of said at least one Geneva cam driver, a disengagement slot for receiving said disengagement roller of said at least one Geneva cam driver and a clamp face;

a drive shaft coupled to said spline of said at least one Geneva cam driver; and an operating mechanism for rotating said drive shaft in a first direction to cause said engagement roller to engage said engagement slot and to cause said clamp face to clamp said clamping apparatus onto said stationary unit, and for rotating said shaft in a second direction to cause said disengagement roller to engage said disengagement slot and to cause said clamp face to unclamp said clamping apparatus from said stationary unit.

8. The service equipment of claim 7 wherein said drive shaft has an end formation for receiving a tool to rotate said drive shaft.

9. Service equipment for use in hostile environments comprising:

a detachable service unit including an exterior plate, a power control interface for connection to an exterior power source, at least two locating located in said exterior plate, a first electrical connector in said exterior plate electrically coupled to said power control interface, and a pair of clamping receptacles formed in said exterior plate and located on adjacent opposite edges of said exterior plate; and a stationary unit including a second electrical connector for connection to said first electrical connector, a base plate with grooves therein, a clamping apparatus including a base plate with grooves therein, wherein a key connector is coupled in said grooves of said base plates of said stationary unit and said clamping apparatus for slidably engaging said base plates together, a clamp assembly for mounting said clamping apparatus onto said stationary unit, and at least two locating pin holes for receiving said locating pins and aligning said detachable service unit onto said stationary plate.

* * * * *